United States Patent
Bryant et al.

(10) Patent No.: US 7,688,539 B1
(45) Date of Patent: Mar. 30, 2010

(54) DISK DRIVE SELF SERVO WRITING SPIRAL TRACKS BY PROPAGATING BURSTS

(75) Inventors: Lawrence M. Bryant, Palo Alto, CA (US); Yakov M. Lifchits, San Jose, CA (US); Siri S. Weerasooriya, Campbell, CA (US)

(73) Assignee: Western Digital Technologies, inc., Lake Forest, CA (US)

( * ) Notice: Subject to any disclaimer, the term of this patent is extended or adjusted under 35 U.S.C. 154(b) by 0 days.

(21) Appl. No.: 12/120,456

(22) Filed: May 14, 2008

(51) Int. Cl.
*G11B 21/02* (2006.01)
*G11B 5/596* (2006.01)

(52) U.S. Cl. .................................... 360/75; 360/77.08

(58) Field of Classification Search .................. None
See application file for complete search history.

(56) References Cited

U.S. PATENT DOCUMENTS

| | | |
|---|---|---|
| 4,414,589 A | 11/1983 | Oliver et al. |
| 5,500,776 A | 3/1996 | Smith |
| 5,541,784 A | 7/1996 | Cribbs et al. |
| 5,612,833 A | 3/1997 | Yarmchuk et al. |
| 5,615,058 A | 3/1997 | Chainer et al. |
| 5,659,436 A | 8/1997 | Yarmchuk et al. |
| 5,668,679 A | 9/1997 | Swearingen et al. |
| 5,757,574 A | 5/1998 | Chainer et al. |
| 5,793,554 A | 8/1998 | Chainer et al. |
| 5,844,742 A | 12/1998 | Yarmchuk et al. |
| 5,875,064 A | 2/1999 | Chainer et al. |
| 5,907,447 A | 5/1999 | Yarmchuk et al. |
| 6,005,738 A | 12/1999 | Chainer et al. |
| 6,008,962 A | 12/1999 | Le et al. |
| 6,031,680 A | 2/2000 | Chainer et al. |
| 6,049,442 A | 4/2000 | Fukushima et al. |
| 6,061,201 A | 5/2000 | Woods |
| 6,075,668 A | 6/2000 | Chainer et al. |
| 6,078,450 A | 6/2000 | Chainer et al. |
| 6,091,564 A | 7/2000 | Codilian et al. |
| 6,101,055 A | 8/2000 | Chainer et al. |
| 6,101,063 A | 8/2000 | Chainer et al. |
| 6,101,064 A | 8/2000 | Shepherd |
| 6,344,942 B1 | 2/2002 | Yarmchuk |
| 6,421,197 B1 | 7/2002 | Abdelnour |
| 6,510,017 B1 | 1/2003 | Abdelnour |
| 6,631,046 B2 | 10/2003 | Szita et al. |
| 6,633,451 B1 | 10/2003 | Chainer et al. |
| 6,650,491 B2 | 11/2003 | Suzuki et al. |
| 6,657,810 B1 | 12/2003 | Kupferman |
| 6,724,558 B2 | 4/2004 | Bryant et al. |
| 6,751,042 B2 | 6/2004 | Bi et al. |
| 6,754,030 B2 | 6/2004 | Seng et al. |
| 6,765,744 B2 | 7/2004 | Gomez et al. |
| 6,798,610 B1 | 9/2004 | Deng et al. |
| 6,947,248 B2 | 9/2005 | Allen et al. |
| 6,954,325 B2 | 10/2005 | Liu et al. |
| 6,977,789 B1 | 12/2005 | Cloke |

(Continued)

*Primary Examiner*—Andrew L Sniezek

(57) ABSTRACT

A disk drive is disclosed comprising a disk, and a head actuated over the disk. The head is positioned at a radial location over the disk, and a servo burst is written at the current radial location. The servo burst is read to generate a read signal, and the read signal is processed to generate a position error signal (PES). The head is moved radially in response to the PES, and the process is repeated multiple times to form a spiral track spanning at least one revolution of the disk.

22 Claims, 5 Drawing Sheets

U.S. PATENT DOCUMENTS

| | | |
|---|---|---|
| 6,989,954 B1 * | 1/2006 | Lee et al. ................ 360/75 |
| 6,992,848 B1 | 1/2006 | Agarwal et al. |
| 7,006,322 B2 | 2/2006 | Sado |
| 7,019,939 B2 | 3/2006 | Kusumoto et al. |
| 7,046,472 B1 | 5/2006 | Melkote et al. |
| 7,088,533 B1 | 8/2006 | Shepherd et al. |
| 7,133,237 B2 | 11/2006 | Ikeda et al. |
| 7,161,759 B1 | 1/2007 | Zhang et al. |
| 7,203,024 B2 | 4/2007 | Lee et al. |
| 7,209,312 B1 | 4/2007 | Sutardja |
| 7,212,369 B1 | 5/2007 | Levy et al |
| 7,215,514 B1 | 5/2007 | Yang et al. |
| 7,405,897 B2 * | 7/2008 | Dougherty et al. ............ 360/75 |
| 7,602,575 B1 | 10/2009 | Lifchits et al. |
| 2005/0168858 A1 | 8/2005 | Lee et al. |
| 2005/0264917 A1 | 12/2005 | Yano et al. |
| 2007/0211367 A1 | 9/2007 | Lau et al. |

\* cited by examiner

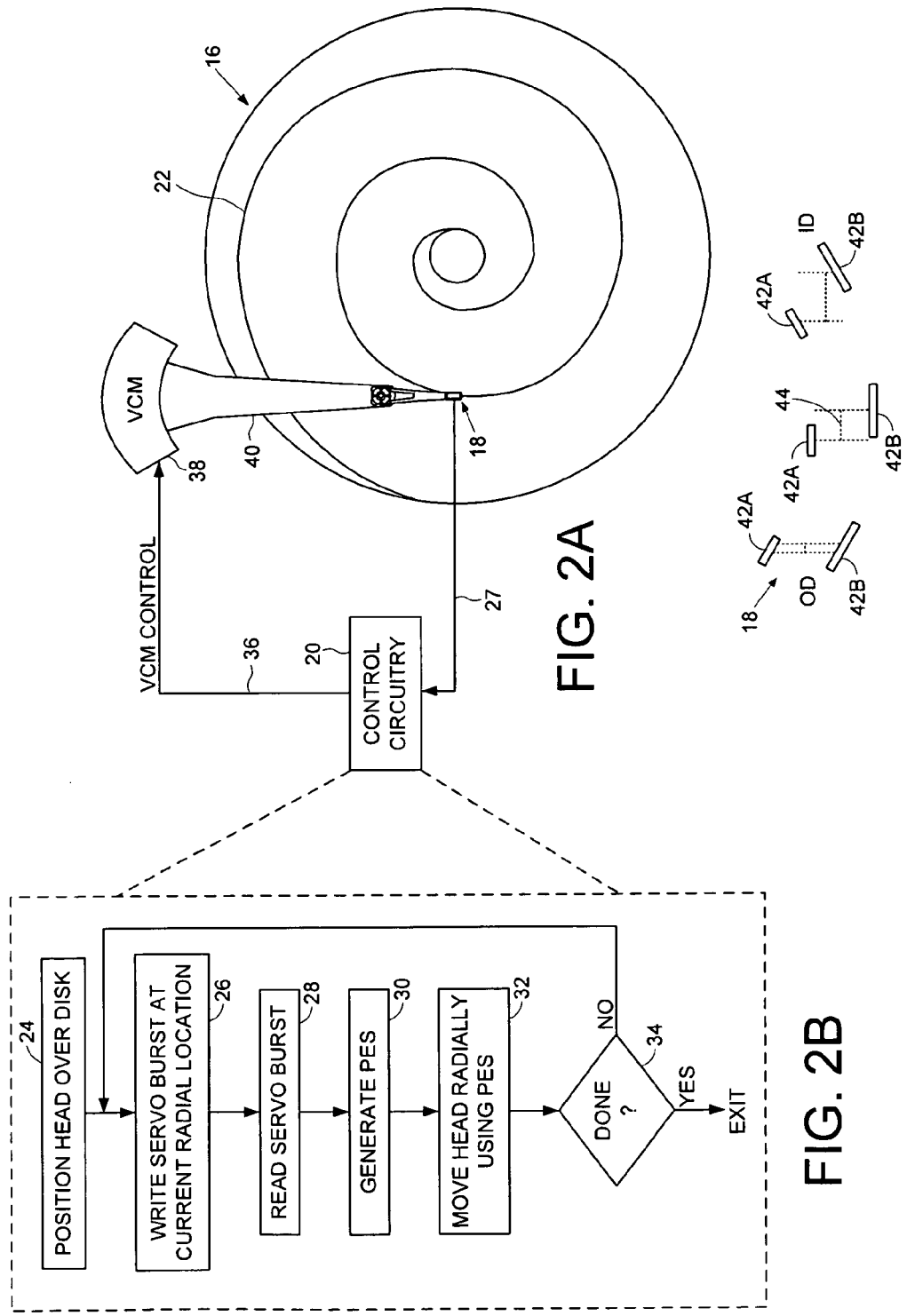

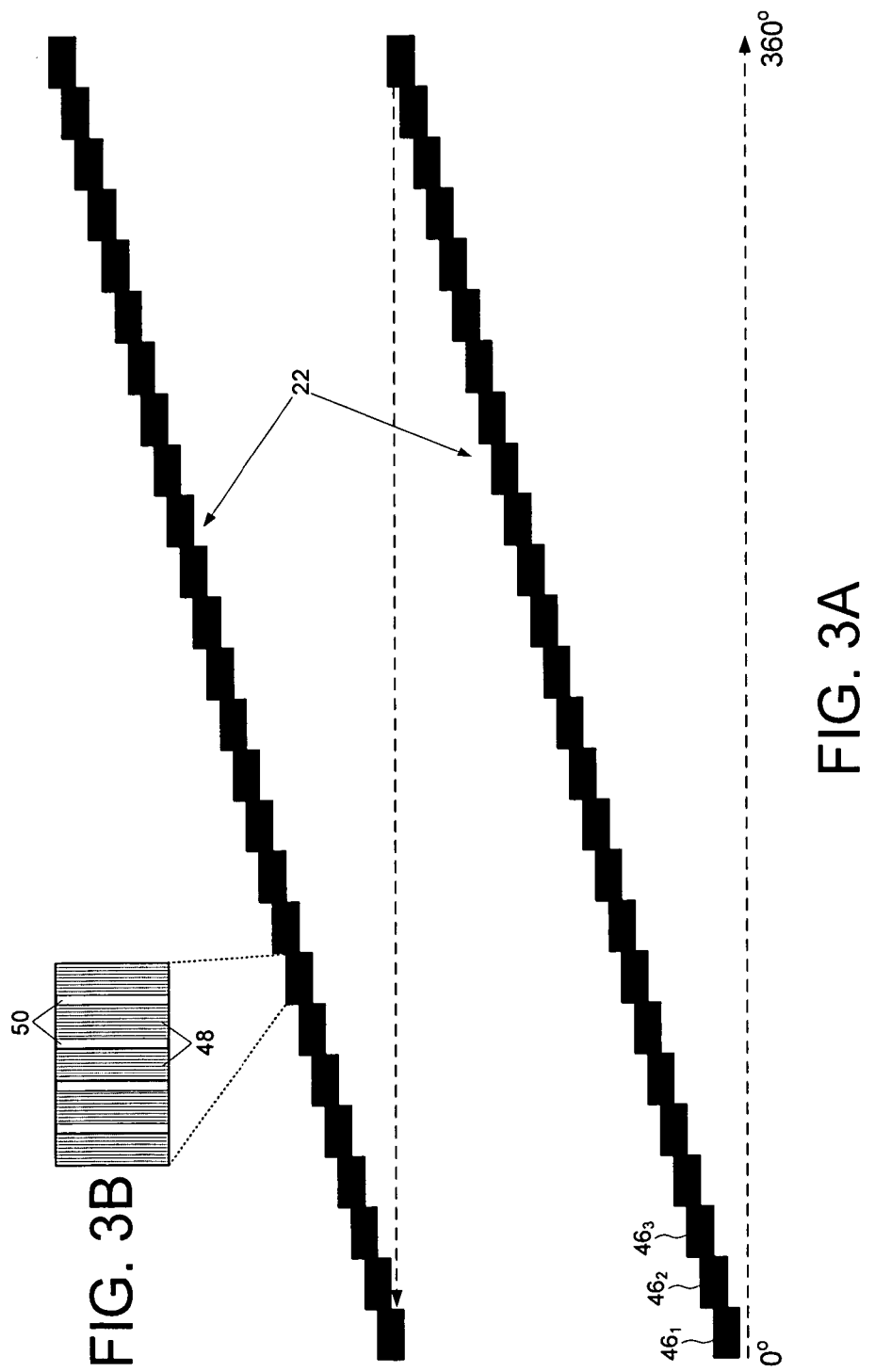

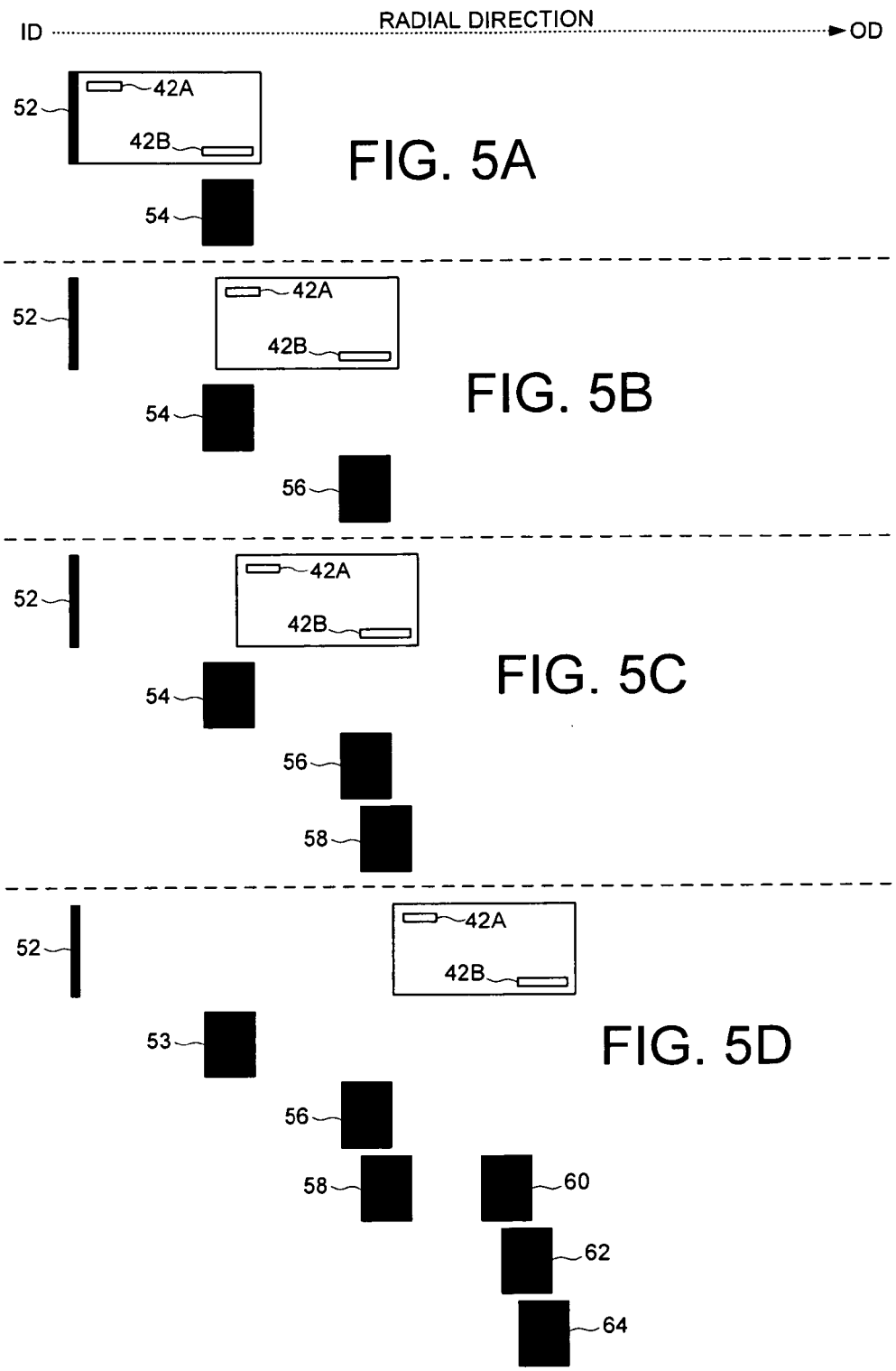

DISK DRIVE SELF SERVO WRITING SPIRAL TRACKS BY PROPAGATING BURSTS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 4 comprising a number of data tracks 6 defined by concentric servo sectors $2_0$-$2_N$ recorded around the circumference of each data track. Each servo sector $2_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $2_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

In the past, external servo writers have been used to write the concentric servo sectors $2_0$-$2_N$ to the disk surface during manufacturing. External servo writers employ extremely accurate head positioning mechanics, such as a laser interferometer or optical encoder, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process. In addition, in spite of their relatively high precision, external servo writers are not accurate enough to write the increasingly higher precision patterns required for newer high capacity disk drives.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral tracks (seed tracks) to the disk which are then processed to write the concentric servo sectors. Each spiral track is written to the disk as a high frequency signal (with missing bits), wherein the position error signal (PES) for tracking is generated relative to time shifts in the detected location of the spiral tracks. The read signal is rectified and low pass filtered to generate a triangular envelope signal representing a spiral track crossing, wherein the location of the spiral track is detected by detecting a peak in the triangular envelope signal relative to a clock synchronized to the rotation of the disk.

BRIEF DESCRIPTION OF THE DRAWINGS

FIG. 2A shows a disk drive according to an embodiment of the present invention comprising a head actuated over the disk, and control circuitry.

FIG. 2B is a flow diagram executed by the control circuitry for writing a spiral track to the disk by propagating servo bursts.

FIG. 2C shows an embodiment of the present invention wherein the head comprises a reader/writer offset such that the read element leads the write element across the radius of the disk.

FIG. 3A illustrates an embodiment of the present invention wherein the servo bursts are propagated over two revolutions of the disk to form the spiral track.

FIG. 3B shows that in one embodiment each servo burst comprises a high frequency signal interrupted by a sync mark at a sync mark interval.

FIGS. 5A-5D show an embodiment of the present invention wherein seed servo bursts are written which are used to start the spiral track writing process.

DETAILED DESCRIPTION OF EMBODIMENTS OF THE INVENTION

Figure 1:
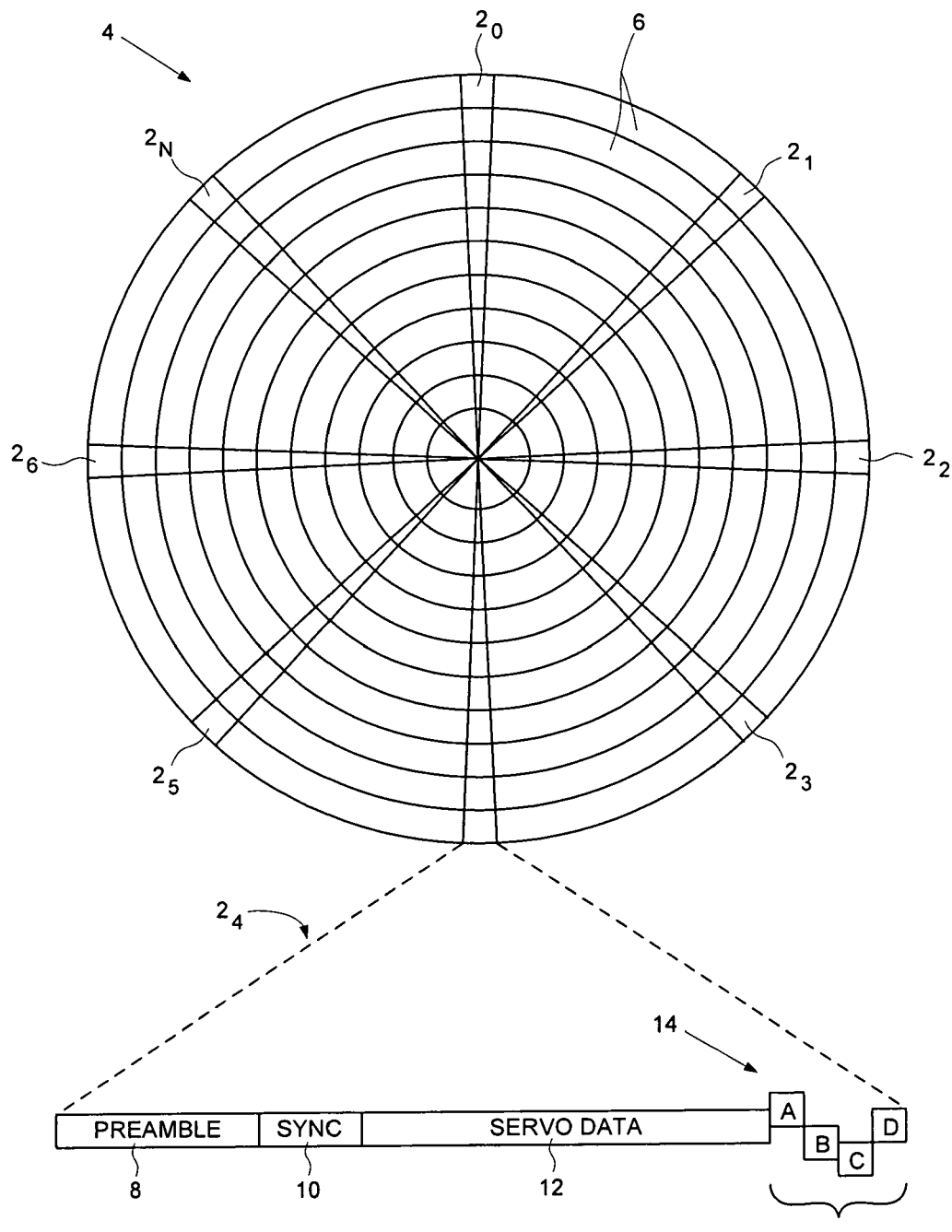
FIG. 1 shows a prior art disk format comprising a plurality of data tracks defined by a plurality of servo sectors.

FIG. 2A shows a disk drive according to an embodiment of the present invention comprising a disk 16, and a head 18 actuated over the disk. The disk drive further comprises control circuitry 20 for writing a spiral track 22 to the disk. The head 18 is positioned at a radial location over the disk (step 24), and a servo burst is written at the current radial location (step 26). The servo burst is read to generate a read signal 27 (step 28), and the read signal is processed to generate a position error signal (PES) (step 30). The head is moved radially in response to the PES (step 32), and the process is repeated multiple times to form the spiral track 22 spanning at least one revolution of the disk.

In the embodiment of FIG. 2A, the control circuitry 20 comprises a suitable compensation filter for filtering the PES to generate a control signal 36 applied to a voice coil motor (VCM) 38. The VCM 38 rotates an actuator arm 40 about a pivot in order to move the head 18 radially in a direction that reduces the PES. Also in the embodiment of FIG. 2A, the head 18 comprises a read element 42A that is offset radially from the write element 42B (FIG. 2C) forming a reader/writer offset 44 such that the write element 42B leads the read element 42A as the head moves radially over substantially the entire radius of the disk. In the embodiment of FIG. 2C, the write element 42B leads the read element 42A as the head moves from the outer diameter of the disk to the inner diameter of the disk. This embodiment enables the read element 42A to read previously written servo burst while writing the propagated servo bursts in the spiral track 22.

FIG. 3A illustrates writing of the spiral track 22 according to an embodiment of the present invention. The read element 42A is positioned over a first servo burst 46, to generate a PES for positioning the write element 42B over the target radial location for writing a second servo burst 46₂. The read element 42A is then positioned over the second servo burst 46₂ to generate a PES for positioning the write element 42B over the target radial location for writing a third servo burst 46₃. The process of propagating the servo bursts repeats for at least one revolution of the disk, and in the embodiment shown in FIG. 3A, for two revolutions of the disk, thereby forming the spiral track 22 of FIG. 2A.

In the embodiment of FIG. 3A, the write operation (when writing the servo bursts) follows the read operation (when reading a previously written servo burst), and the delay between switching between the read and write operation can be quite small (which may not be the case if switching from a write to a read operation). Therefore, the servo bursts may be written in a substantially continuous pattern as shown in FIG. 3A which may reduce the amount of radial positioning as well as timing errors.

In an embodiment shown in FIG. 3B, each servo burst comprises a high frequency signal 48 interrupted by a sync mark 50 at a sync mark interval. When reading the servo bursts in the spiral track 22, the high frequency signal 48 may be demodulated into a PES for servoing the head, and the sync marks 50 may be used for timing recovery, for example, to synchronize a phase locked loop (PLL). In one embodiment, the high frequency signal 48 may also be used for timing recovery, for example, to generate a fine timing measurement used to adjust a PLL.

Figure 4A:
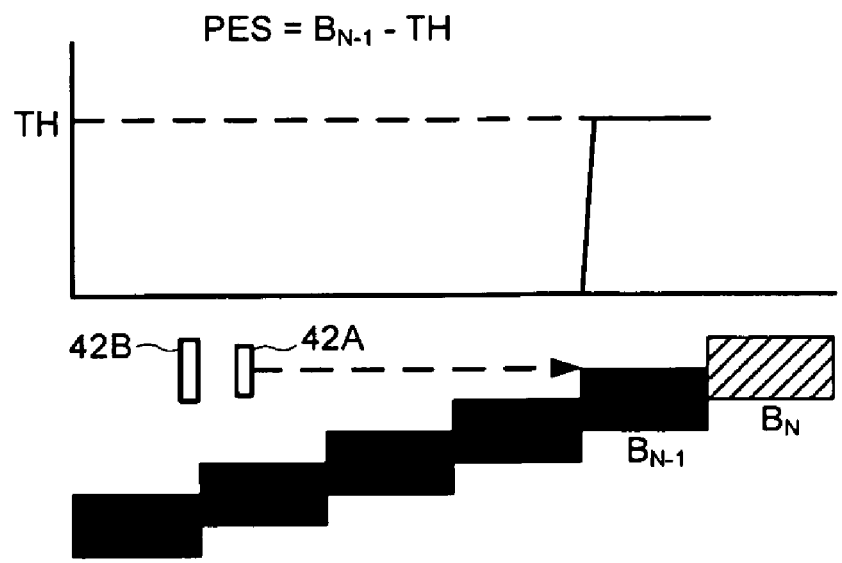
FIG. 4A shows an embodiment of the present invention wherein over at least part of the stroke of the actuator arm, there is no radial offset between the read element and the write element, wherein the PES for servoing the head is generated by reading a percentage of a previously written servo burst.

The PES for servoing the head when propagating the servo bursts of the spiral track 22 may be generated in any suitable manner. FIG. 4A shows an embodiment of the present invention wherein over at least part of the stroke of the actuator arm 40, there is no radial offset between the read element 42A and the write element 42B. The PES for servoing the head is generated by reading a percentage of a previously written servo burst. For example, in FIG. 4A the read element 42A may be positioned over 70% of the previously written servo burst $B_{N-1}$ while writing the next servo burst $B_N$. The PES is then generated as the difference between an amplitude of the read signal (or an amplitude of the integrated signal) and a predetermined threshold.

Figure 4B:
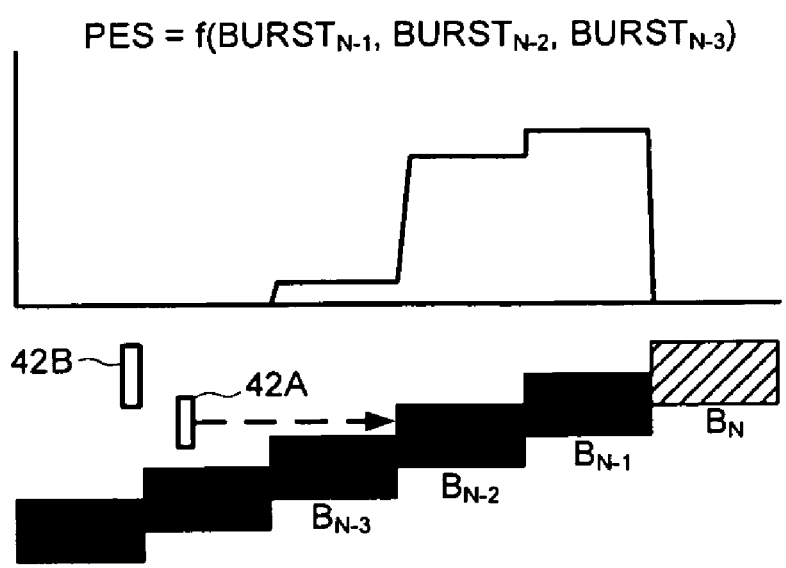
FIG. 4B shows an embodiment of the present invention wherein over at least part of the stroke of the actuator arm, there is a radial offset between the read element and the write element, wherein the PES for servoing the head is generated by reading a plurality of the previously written servo bursts.

In an embodiment shown in FIG. 4B, over at least part of the stroke of the actuator arm 40 there is a radial offset between the read element 42A and the write element 42B. The PES for servoing the head is generated by reading a plurality of the previously written servo bursts. For example, in FIG. 4B the read element 42A may be positioned so as to span three previously written servo bursts ($B_{N-3}$, $B_{N-2}$, $B_{N-1}$) when writing the next servo burst $B_N$. The PES may be generated as a function of the read signal when reading the three servo bursts, for example, the read signal may be correlated with a target pattern (such as the pattern shown in FIG. 4B), and the result compared to a predetermined threshold. In one embodiment, a combination of different techniques may be employed for generating the PES, such as the technique described above with reference to FIG. 4A as well as the technique of FIG. 4B.

Any suitable radial spacing of the servo bursts in the spiral track 22 may be employed in the embodiments of the present invention. For example, the radial spacing may be selected to be between 5% and 50% of the width of each servo burst, that is, the radial offset when positioning the write element 42B may be selected to be between 5% and 50% of the width of each servo burst. In one embodiment, the radial spacing of the servo bursts may be determined by selecting an appropriate target threshold for generating the PES. Using a smaller radial spacing between the servo bursts may improve the resulting signal quality when servoing off of the servo bursts, whereas increasing the radial spacing between the servo bursts decreases the time required to write the spiral track 22 (requires less revolutions of the disk to propagate the spiral track 22 from the outer diameter to the inner diameter or from the inner diameter to the outer diameter).

In one embodiment, prior to writing the spiral tracks, seed servo bursts are written to the disk to facilitate starting the servo burst propagation process. The seed servo bursts may be written to the disk in any suitable manner, such as with an external servo writer, or a media writer. In another embodiment, the actuator arm 30 may be pressed against a crash stop in order to write a seed servo burst from which other servo bursts are propagated (e.g., using the PES generation technique described above with reference to FIG. 4A).

FIGS. 5A-5D illustrate an alternative embodiment for writing a plurality of seed servo bursts which may be used to position the head initially by generating the PES using the technique described above with reference to FIG. 4B. The write element 42B is positioned at a first radial location, for example, by moving the actuator arm 40 until it presses against a crash stop 52. A first servo burst 54 is written at the first radial location, and then the read element 42A is positioned at a first percentage (e.g., 75%) over the first servo burst 54 in order to position the write element 42B at a second radial location. A second servo burst 56 is then written at the second radial location. The read element 42A is positioned at a second percentage (e.g., 25%) over the first servo burst 54 in order to position the write element 42B at a third radial location, and a third servo burst 58 is written at the third radial location. This process is repeated using newly written servo bursts 56 and 58 for positioning the read element at several positions relative to bursts 56 and 58 in order to write servo bursts 60-64, and so on, until a full set of servo bursts have been written enabling the read element 42A to generate the PES using the technique of FIG. 4B. In the embodiment of FIG. 5D, the resulting seed servo bursts are offset radially by 50% of the width of the read element 42A, however, any suitable spacing may be employed.

In one embodiment, a plurality of spiral tracks 22 is written on the disk which are separated circumferentially at a predetermined spacing. In this embodiment, a number of concentric seed servo bursts are written around the circumference of the disk, for example, near the outer diameter or the inner diameter of the disk. One of the concentric servo bursts (or a set) is processed to begin the propagation process for each spiral track.

The spiral tracks 22 may be utilized by the disk drive in any suitable manner. In one embodiment, the spiral tracks 22 are used to servo the head during normal operation when writing user data to the disk and reading the user data from the disk. In one embodiment, additional servo information is written together with the servo bursts in the spiral tracks 22, such as a track address similar to the conventional concentric servo sectors shown in FIG. 1. In another embodiment, the spiral tracks 22 are used to servo the head while writing concentric servo sectors to the disk, such as the concentric servo sectors shown in FIG. 1. In this embodiment, the spiral tracks 22 serve as seed tracks for self servo writing the disk.

Any suitable control circuitry may be employed to implement the flow diagrams in the embodiments of the present invention, such as any suitable integrated circuit or circuits.

For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk; and
   control circuitry operable to:
   (a) position the head at a radial location over the disk;
   (b) write a servo burst at the current radial location;
   (c) read the servo burst to generate a read signal;
   (d) process the read signal to generate a position error signal (PES);
   (e) move the head radially in response to the PES; and
   (f) repeat (b) through (e) multiple times to form a spiral track spanning at least one revolution of the disk in a circumferential direction, and scanning a substantial part of the disk in a radial direction;
   wherein:
   the head comprises a read element radially offset from the write element; and
   the control circuitry is further operable to write a seed track to the disk by:
   positioning the write element at first radial location;
   writing a first servo burst at the first radial location;
   positioning the read element at a first percentage over the first servo burst in order to position the write element at a second radial location;
   writing a second servo burst at the second radial location;
   positioning the read element at a second percentage over the first servo burst in order to position the write element at a third radial location;
   writing a third servo burst at the third radial location; and
   the head is positioned at the radial location over the disk in step (a) in response to the seed track.

2. The disk drive as recited in claim 1, wherein:
   the head comprises a read element offset radially from a write element; and
   the write element leads the read element as the head moves radially over substantially the entire radius of the disk.

3. The disk drive as recited in claim 1, wherein the spiral track spans multiple revolutions of the disk.

4. The disk drive as recited in claim 1, wherein the control circuitry is further operable to repeat (a) through (f) to write a plurality of spiral tracks to the disk.

5. The disk drive as recited in claim 1, wherein each servo burst comprises a high frequency signal interrupted by a sync mark at a sync mark interval.

6. The disk drive as recited in claim 1, wherein the control circuitry is operable to move the head radially at (e) from an outer diameter of the disk toward an inner diameter of the disk.

7. The disk drive as recited in claim 1, wherein the control circuitry is operable to move the head radially at (e) from an inner diameter of the disk toward an outer diameter of the disk.

8. The disk drive as recited in claim 1, wherein the control circuitry is operable to generate the PES relative to an amplitude of the read signal.

9. The disk drive as recited in claim 1, wherein the control circuitry is operable to read at least two of the servo bursts to generate the read signal used to generate the PES.

10. The disk drive as recited in claim 1, wherein the control circuitry is further operable to process the spiral track to write concentric servo sectors to the disk.

11. The disk drive as recited in claim 1, wherein:
    the first percentage is approximately twenty-five percent; and
    the second percentage is approximately seventy-five percent.

12. A method of writing a spiral track to a disk of a disk drive, the disk drive comprising a head actuated over the disk, the method comprising:
    (a) positioning the head at a radial location over the disk;
    (b) writing a servo burst at the current radial location;
    (c) reading the servo burst to generate a read signal;
    (d) processing the read signal to generate a position error signal (PES);
    (e) moving the head radially in response to the PES; and
    (f) repeating (b) through (e) multiple times to form a spiral track spanning at least one revolution of the disk in a circumferential direction, and scanning a substantial part of the disk in a radial direction;
    wherein:
    the head comprises a read element radially offset from the write element; and
    the method further comprises writing a seed track to the disk by:
    positioning the write element at first radial location;
    writing a first servo burst at the first radial location;
    positioning the read element at a first percentage over the first servo burst in order to position the write element at a second radial location;
    writing a second servo burst at the second radial location;
    positioning the read element at a second percentage over the first servo burst in order to position the write element at a third radial location;
    writing a third servo burst at the third radial location; and
    the head is positioned at the radial location over the disk in step (a) in response to the seed track.

13. The method as recited in claim 12, wherein:
    the head comprises a read element offset radially from a write element; and
    the write element leads the read element as the head moves radially over substantially the entire radius of the disk.

14. The method as recited in claim 12, wherein the spiral track spans multiple revolutions of the disk.

15. The method as recited in claim 12, further comprising repeating (a) through (f) to write a plurality of spiral tracks to the disk.

16. The method as recited in claim 12, wherein each servo burst comprises a high frequency signal interrupted by a sync mark at a sync mark interval.

17. The method as recited in claim 12, wherein moving the head radially at (e) comprises moving the head from an outer diameter of the disk toward an inner diameter of the disk.

18. The method as recited in claim 12, wherein moving the head radially at (e) comprises moving the head from an inner diameter of the disk toward an outer diameter of the disk.

19. The method as recited in claim 12, wherein the PES is generated relative to an amplitude of the read signal.

20. The method as recited in claim 12, further comprising reading at least two of the servo bursts to generate the read signal used to generate the PES.

21. The method as recited in claim 12, further comprising processing the spiral track to write concentric servo sectors to the disk.

22. The method as recited in claim 12, wherein:

the first percentage is approximately twenty-five percent; and the second percentage is approximately seventy-five percent.

* * * * *